Patented Sept. 16, 1924.

1,509,083

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

IMPERISHABLE MILK.

No Drawing. Application filed November 2, 1922. Serial No. 598,512.

*To all whom it may concern:*

Be it known that I, CHARLES E. NORTH, a citizen of the United States of America, residing at Montclair, in the county of Essex and State of New Jersey, have invented certain new and useful Improvements in Imperishable Milk, of which the following is a full, clear, and exact description.

The decomposition or deterioration of milk is of a two fold nature—souring and putrefaction. The first results from the development of lactic acid produced from the milk sugar, a normal constituent of the milk, which is changed into lactic acid by the growth and activity of microscopic organisms known as lactic acid bacteria. These consume the milk sugar as a food and through digestive processes discharge it as lactic acid. The action of these bacteria is so rapid that under favorable temperature conditions they are able in a few hours to transform the larger part of the milk sugar constituent into lactic acid. This acid acts upon the proteids, especially the casein, producing coagulation or clotting. In short, the souring of milk and cream consists in the production of lactic acid and the clotting or coagulation of casein which forms what is commonly known as the curd.

The second form of decomposition is due to the direct action of microscopic organisms on the casein itself. These organisms are known as putrefying bacteria, and change the casein into a liquid, forming exceedingly ill smelling products of putrefaction. Their action is slower than that of the lactic acid bacteria, but it is even more destructive of the integrity of sweet milk and cream.

Both the acid products of the lactic acid bacteria and the chemical products of putrefying bacteria are capable of producing a chemical action on the milk fat proper and decompose some of its more delicate fats, resulting in rancidity through the release of some of the fatty acids. The familiar rancidity of butter and butter fat is the result of this chemical action.

The perishability of milk and cream being thus due, primarily, to the action of bacteria on milk sugar and casein, it is the presence of these ingredients in the milk that is responsible for its perishability and that of the products made therefrom, and if these could be entirely removed there would remain no food for the bacteria of decomposition since the milk or butter fat of itself does not furnish such a food.

The complete elimination of the objectionable ingredients of milk and cream from the fat now is rendered possible by the recent discovery of methods of producing milk fat from the milk or cream, and as this pure oil when properly separated out, contains no milk sugar, no casein, no albumin, no ash, and less than one-tenth of one percent of water, it does not furnish food for either type of bacteria.

The emulsion of milk fat in milk or cream is due to the physical balance between the milk serum and the fat, whereby the latter is suspended in the serum in the form of fine round globules. The presence in the serum of solids other than fat to the extent of 8½% thickens the water of the serum to an extent that results in a viscosity sufficient to hold the milk fat in an emulsified form or condition. These solids consist of a mixture of casein, milk-sugar, albumin and ash.

Recognizing the above described facts I have found by experiment that I may imitate the original products and form an emulsion of milk fat and pure water by the use of other thickeners which are not open to the same objections as obtain in the case of the usual milk ingredients. For example, I may by known mechanical means, produce a permanent emulsion of milk fat and water by the use of white of egg, gelatine, agar and many of the vegetable gums, such as gum tragacanth, or gum arabic. The resulting product is a white emulsion containing, in addition to the milk fat, water and the thickeners only, and entirely free from milk sugar, casein and other milk solids, not fat. The entire absence of such solids prevents the action of bacteria which cause decomposition, as such bacteria are not developed by the milk fat or the thickeners above. This emulsion, therefore, while properly protected from the air will not decompose, but remain permanently sweet.

Normal cream contains percentages of solids not fat which vary according to the amount of fat present. For example, a thin cream may contain 25% fat, 7% solids not fat, and 68% water. To produce an imperishable cream with the same fat content, therefore, I take 25% milk fat or oil, 7% of a suitable thickener, such as gum arabic, and 68% water, and pass them through a mechanical emulsifier to produce a cream entirely free from milk-sugar, casein and other decomposing ingredients. Such a cream has a clean flavor and odor, or it may be artificially flavored as desired. When kept in containers out of contact with air so that there is no action of oxygen on the milk fat, a permanent emulsion is formed which will keep sweet indefinitely.

If a thicker cream is desired, a suitable thickener may be substituted for the solids in natural thick cream and the same process followed. For example, cream which contains 50% fat may have 5% of other milk solids and 45% water. This may be imitated by emulsifying 50% milk oil, 5% gum arabic and 45% water. The result will be an emulsion which looks and tastes like rich cream and which will not decompose by souring or by putrefaction.

By this means I produce a substantially imperishable milk or cream of any desired richness.

What I claim as my invention is:

1. The process herein described of producing imitation and imperishable milk or cream which consists in emulsifying milk oil, water and such a thickener as a vegetable gum which is capable of producing a permanent emulsion, the milk oil and water being in such proportionate amounts as are present in the natural products imitated.

2. Imitation and imperishable milk or cream comprised of milk oil, water and an emulsifying agent such as gum arabic, these ingredients in the order named being in substantially the same relative proportions as the corresponding ingredients, the fat, water and non-fat solids present in the product imitated.

In testimony whereof I hereto affix my signature.

CHARLES E. NORTH.